Figure 1:
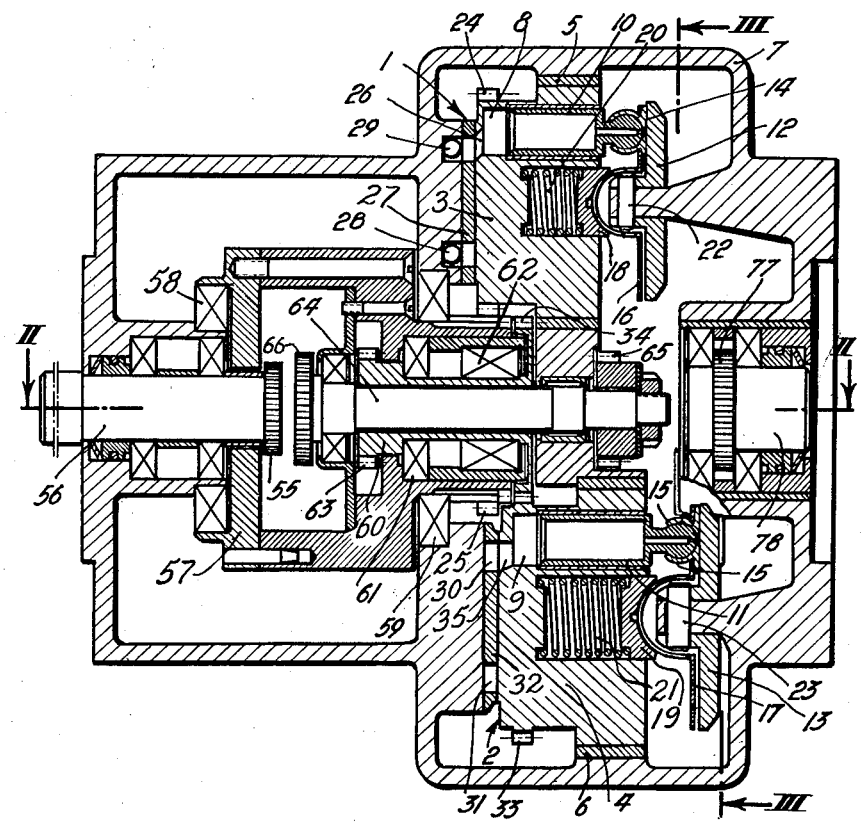

Oct. 17, 1961  G. GARNIER  3,004,450
HYDRAULIC TRANSMISSION
Filed July 9, 1957  5 Sheets-Sheet 1

Inventor
GEORGES GARNIER
By Taulmin & Taulmin
Attorneys.

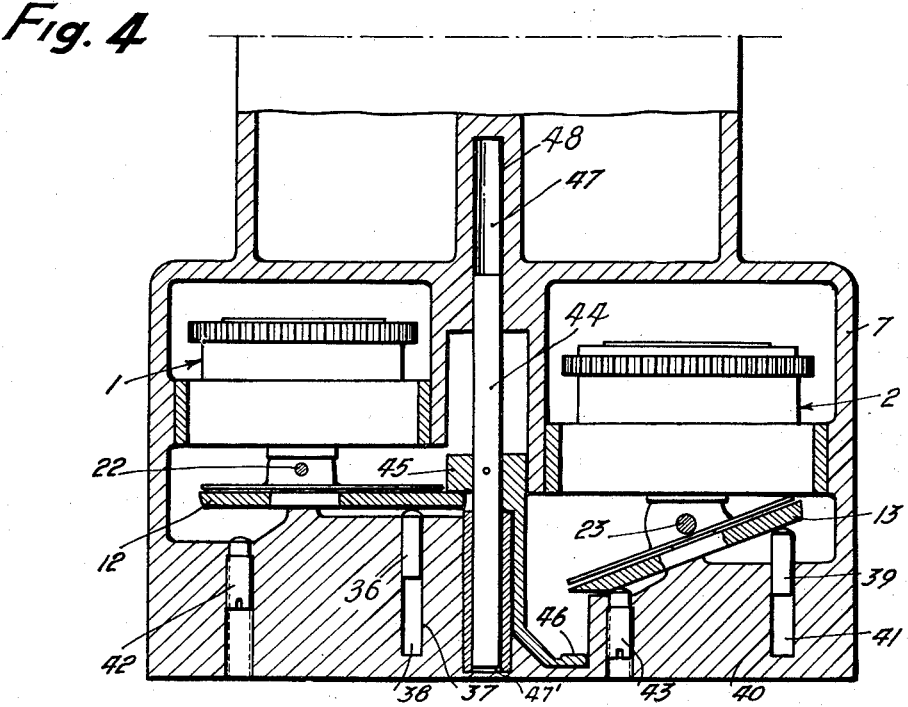
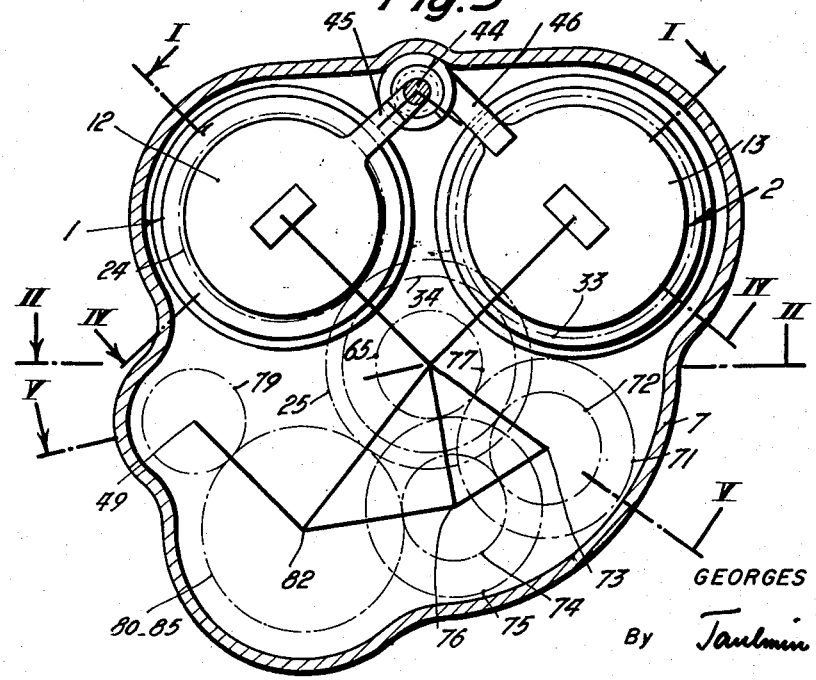

Inventor
GEORGES GARNIER
By Taulmin & Taulmin
Attorneys

United States Patent Office 3,004,450
Patented Oct. 17, 1961

3,004,450
HYDRAULIC TRANSMISSION
Georges Garnier, Asnieres, France, assignor to Air-Equipement, Asnieres, Seine, France, a French company
Filed July 9, 1957, Ser. No. 670,793
Claims priority, application France July 25, 1956
1 Claim. (Cl. 74—687)

The present invention relates to hydraulic transmissions having a continuously variable transmission ratio, especially transmissions interposed between a motor or a jet engine of an aircraft and an apparatus driven by this motor or jet engine and, in particular, transmissions interposed, for example, between an electric alternator whose speed (output speed of the transmission) must be maintained constant and a power take-off from the motor or jet engine of the aircraft having variable speed (input speed of the transmission).

There have already been proposed for variable-speed hydraulic drives, differential arrangements in which there are employed two hydraulic devices each being formed, for example, by a cylindrical block or body in which are movable pistons, the travel of these pistons in the cylindrical block being controlled by a displacement relative to suitable means, for example cam means.

It is possible to drive in rotation, by means of the input shaft, the means controlling the pistons or the cylindrical block of one of the devices, and, by means of the output shaft, the means controlling the pistons of the cylindrical block of the other device. Only one of the hydraulic devices is arranged to have a variable output. In the proposed differential systems there are interconnected one of the parts of the input device and one of the parts of the output device (for example, the means controlling the pistons of the input device and the means controlling the pistons of the output device, the cylindrical block of the input device and the cylindrical block of the output device, the cylindrical block of the input device and the means controlling the pistons of the output device, or the means controlling the pistons of the input device and the cylindrical block of the output device), so that when the speeds of the input shaft and the output shaft are equal, no relative movement occurs between the pistons of the two devices and their respective control means. As one of the hydraulic devices is arranged to effect maximum travel and the other no travel, no hydraulic exchange occurs between the two devices other than that required to compensate for leakages between the pistons and the cylindrical blocks, and, by means of the hydraulic distribution of valving between the hydraulic devices, the power is transmitted mechanically from one device to the other owing to a hydraulic locking of the two devices.

In this arrangement, efficiency is good when the input and output speeds are exactly equal or close to one another, but when they are very different, a part of the power must be necessarily transmitted hydraulically between the two devices and the advantage gained from these differential transmissions, relative to a conventional hydraulic transmission, is relatively small. This arrangement always requires maximum capacities per rotation of the two devices, almost at the ratio between the input and output speeds, one of the hydraulic devices having a capacity several times the capacity of the other hydraulic device.

It has also been proposed to connect to the input and output shafts and to the differential system of the aforementioned hydraulic devices, only one of which devices has a variable output, at least two planetary differentials so as to obtain a four-way transmission through which the hydraulic power transmitted tends asymptotically toward zero value, on the one hand, when the speed tends toward zero and, on the other hand when the speed reaches a certain value.

But in actual fact there is no point in trying to obtain maximum transmission efficiency for zero speed, which is of no use in itself and corresponds to infinite pressure increase in one of the hydraulic devices and requires regulating means which cancels out this advantage.

One object of the invention is to obtain that transmission efficiency be maximum for the most frequent or usual operational conditions. In the case of an aircraft motor or jet engine, these conditions correspond to idling speed and the most usual operational speed, namely cruising speed. The speeds of the motor or jet engine between the aforementioned two speeds are speeds which are not used in a continuous manner, and the same is true of speeds in excess of cruising speed. Transmission efficiency which is a little lower in these cases is permissible.

Another object is to permit the control of the hydraulic devices in such manner that the output shaft has a constant speed irrespective of the speed of the input shaft, starting from minimum speed of the latter. More particularly, said hydraulic devices are controlled in such manner that, from zero speed to the lower of said two usual operational speeds the output of the first device is maximum whereas the output of the second device is zero, from the lower usual operational speed to the mean speed of said two operational speeds, the output of the first device remains maximum whereas the output of the second device increases from zero to maximum, from the mean speed of said two usual operational speeds to the higher of said operational speeds, the output of the first device decreases from maximum to zero whereas the output of the second device remains maximum, and for speeds exceeding the higher of said usual operational speeds, the output of the first device is reversed whereas that of the second device remains maximum.

Further features and advantages of the invention will be apparent from the ensuing description with reference to the accompanying drawings of a transmission embodying the invention adapted to be interposed between a variable-speed input shaft, for example connected to a power take-off of an aircraft motor, and a constant-speed output shaft, for example adapted to drive an alternator, said embodiment being given as an example, and the invention being in no way restricted to said embodiment.

Figure 2:
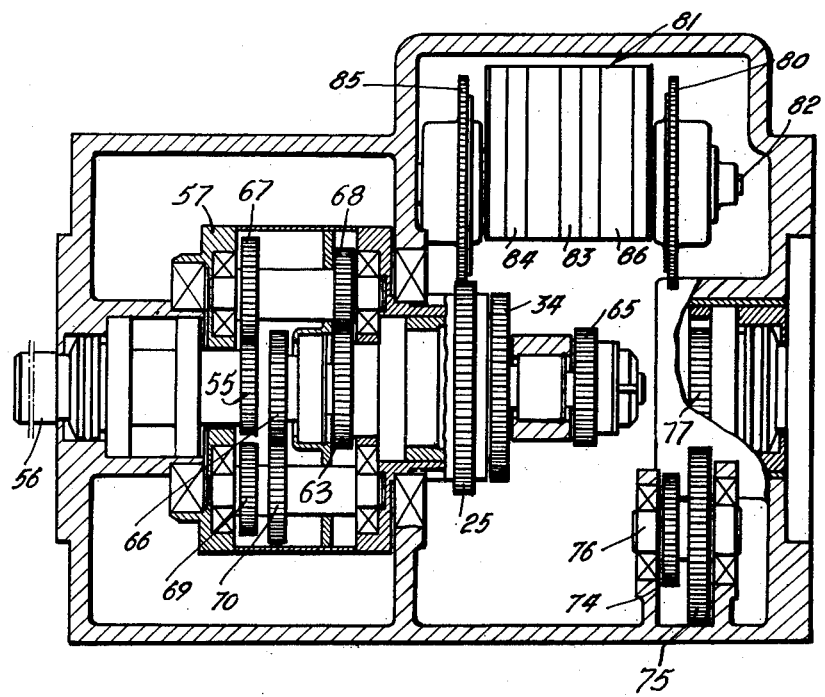
Figure 5:
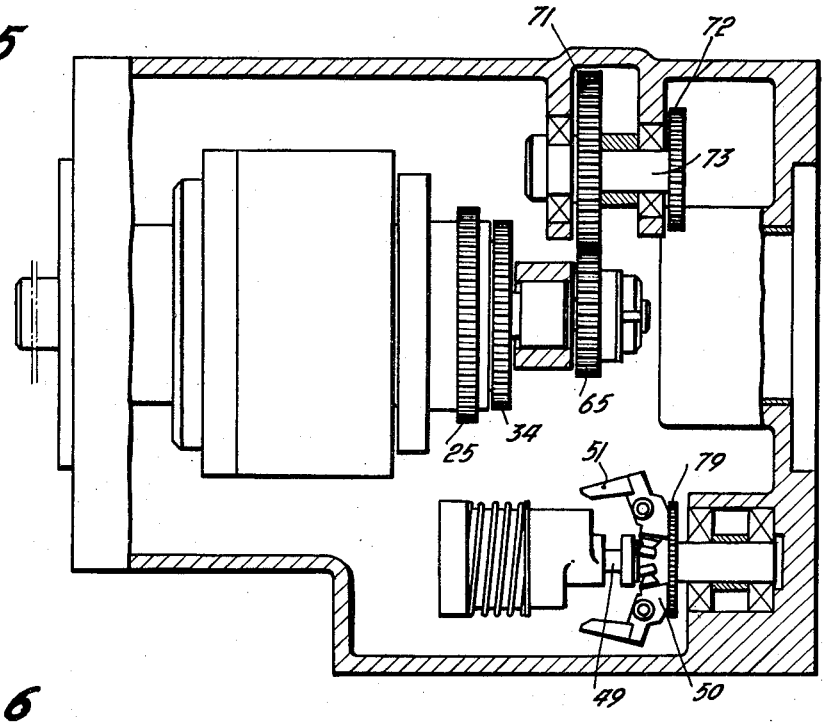
Figure 6:
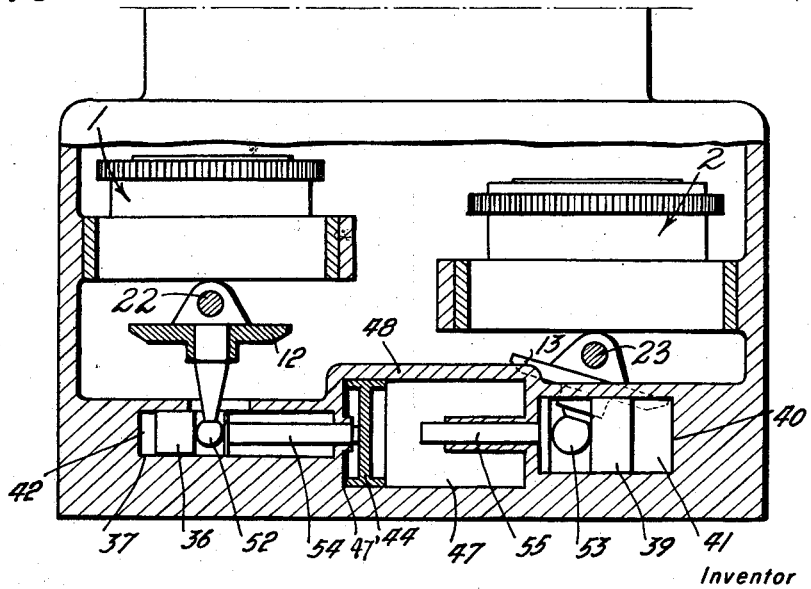
Figure 7:
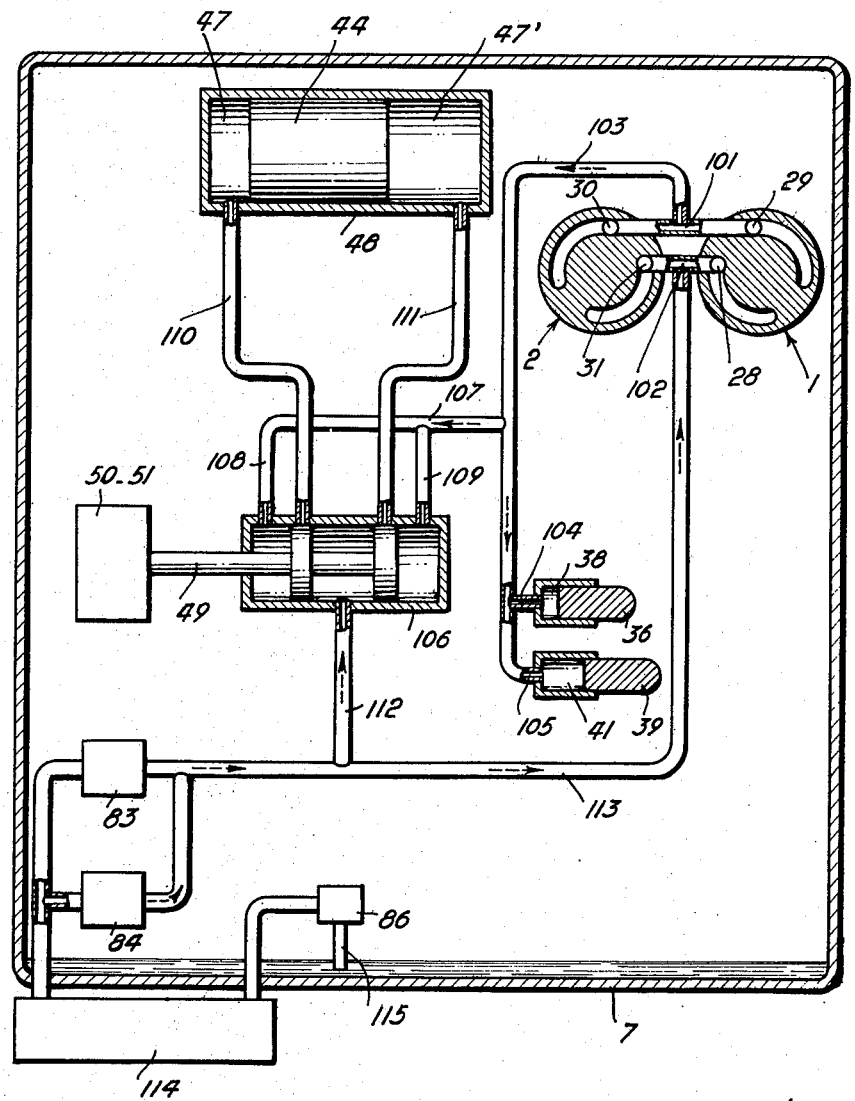

In the drawings:
FIG. 1 is an axial sectional view of a transmission embodying the invention, taken along line I—I of FIG. 3;
FIG. 2 is an axial sectional view taken along line II—II of FIG. 3;
FIG. 3 is a cross-sectional view taken along line III—III of FIG. 1, the gears being shown diagrammatically by their pitch circles.
FIG. 4 is a sectional view, taken along line IV—IV of FIG. 3, showing the means controlling the inclination of the cams;
FIG. 5 is an axial sectional view taken along line V—V of FIG. 3, and
FIG. 6 is a sectional view of a modification of the means controlling the inclination of the cams.
FIG. 7 is a diagrammatic view of the general hydraulic circuit.

In the embodiment shown in the figures, the hydraulic speed variator of the invention comprises two associated hydraulic units or devices 1 and 2, each of which comprises a barrel pump of which the cylindrical block or rotor 3 or 4 respectively is carried by a bearing 5 or 6 mounted in the case 7 of the transmission. Bores 8, 9 parallel with the transmission axis and formed in the rotor 3, 4, contain the pistons 10, 11 which bear against a cam 12, 13 through the medium of sliding pads 14, 15. The pads 14, 15 are applied against the corresponding cam 12, 13 by a plate 16, 17 which bears against a ball journal 18, 19 urged toward the cam 12, 13 by a spring 20, 21 respectively.

The cam 12, 13 is orientable about a journal 22, 23 carried by the case 7.

The rotor 3 of the pump 1 is driven in rotation in its bearing 5 by a gear 24 fixed thereto and meshed with a gear 25 of a gear train which will be described hereinafter.

If the cam 12 is given, by the means described hereinafter, a certain inclination relative to the rotor 3 driven in rotation, the pistons 10 will be caused to reciprocate within the bores 8 and to discharge fluid at a certain output depending on the inclination of said cam 12.

Ports 26 connect the bores of the rotor 3 to a distributing or valving port plate 27 which communicates with a liquid input port 28 and a liquid output port 29 connected through passageways 101, 102 (FIG. 7) to corresponding ports 30, 31 of a distributor plate 32 pertaining to the second hydraulic device or unit 2.

The rotor 4 of the second hydraulic unit 2 is driven in rotation in its bearing 6 by the gear 33 fixed to this rotor and meshed with the gear 34 of a gear train described hereinafter.

If the cam 13 is given, by the means described hereinafter, a certain inclination relative to the rotor 4 driven in rotation, the pistons 11 will be caused to reciprocate within the bores 9 and to discharge fluid at a certain output depending on the inclination of said cam 13.

Ports 35 connect bores 9 of the rotor 4 to the distributor plate 32.

As can be seen from FIG. 4, the cam 12 is constantly urged into a position of maximum inclination by a piston 36 which moves in a cylindrical aperture 37 formed in the case 7, and conventionally connected through the pipes 103 and 104 (FIG. 7) to the output pressure zones of the hydraulic units so that the pressure of the liquid acts in the chamber 38 behind the piston 36. Further, the cam 13 is constantly urged into a position of maximum inclination by a piston 39 which moves in a cylindrical aperture 40 formed in the case 7, and conventionally connected through the pipes 103 and 105 (FIG. 7) to the output pressure zones of the hydraulic units so that the pressure of the liquid supplied by the hydraulic unit 2 acting in the chamber 41 behind the piston 39. Adjustable abutments 42, 43 limit the pivotal movement of the cams 12 and 13 about their respective journals 22 and 23.

A piston 44, to which is fixed a double finger 45, 46, is adapted to determine the position of one or the other of the cams 12 or 13 under the effect of the pressure of the fluid acting in a chamber 47 or 47' of a cylinder 48 in which the piston 44 moves. The pressure of the fluid in the chamber 47 or 47' depends on the position of a slide 49 (see FIG. 5) actuated in conventional manner by a governor 50 having weights 51. Said slide 49 controls a distributing valve of any known type which connects either chamber 47 or 47' to the output pressure zones of the hydraulic units 1 or 2. The fluid under pressure flows, through pipes 103, 107, 108 and 109 to both ends of the distributing valve 106 (FIG. 7). When the slide 49 is at its right end position, the pressure fluid flows into chamber 47 through pipe 110, and when the slide 49 is at its left end position, the fluid flows into chamber 47' through pipe 111. The connections are such as to allow admission of the output pressure into chamber 47 when the speed of the input shaft 56, and therefore of output gear 77, is low, and progressively into chamber 47' when said speed increases, so that piston 44 is pushed against the bottom of chamber 47' at the lower speed and against the bottom of chamber 47 at the higher speed.

The mechanical part of the transmission comprises a double epicyclic gear train including a sun gear 55 fixed as concerns rotation to a variable-speed input shaft 56, a planet gear carrier 57 rotatably mounted in anti-friction bearings, such as ball bearings, 58, 59, a hollow intermediate shaft 60 journalled in bearings 61, 62 inside the carrier 57 and carrying the gear 34 which meshes with the gear 33 of the hydraulic device or pump 2 and a gear 63 which constitutes the output sun gear of the first differential, and an inner shaft 64 which extends through the hollow shaft 60 and carries at both ends an output gear 65 and the output sun gear 66 of the second differential gear train.

The carrier 57 carries two series of planet gears having double teeth, that is, planet gears 67, 68 respectively meshed with sun gears 55 and 63, planet gears 69, 70 respectively meshed with the planet gears 67 and the sun gear 66.

A train of spur gears comprising gears 71, 72 mounted on a common shaft 73 (see FIG. 5) and gears 74, 75 mounted on a common shaft 76 acts as a speed reverser to convert the direction of rotation to the opposite direction in driving gear 77.

The centrifugal governor 50, actuating the distributor valve 49, is driven by gear 79 which is mounted on the governor shaft and meshes with a gear 80 mounted on the shaft 82 of liquid circulating pumps 83 and 86, the gear 80 being meshed with the gear 74 of the shaft 76 drivingly connected, as explained above, to driving gear 77.

The liquid circulation pump unit 81 comprises the two supply pumps 83, 84, the pump 84 being driven by the carrier 57 through the gear 85 meshed with the gear 25, and the pump 83 being driven together with a drainage pump 86 by gear 74 through gear 80.

The pumps 83, 84, connected in parallel deliver oil from the feed-tank 114 to the suction side of pumps 1 and 2 through the low pressure pipe 113, the latter having a branch-pipe 113 towards valve 106. Pump 86 returns to tank 114 the oil sucked at the bottom of housing 7 through pipe 115.

The transmission operates in the following manner:

When the input shaft 56 is driven at a speed lower than or equal to the idling speed of the motor, for example at 2000 r.p.m., the slide 49 of the governor 50 is in such position that the discharge or output pressure acts in the chamber 47 or 47' of the cylinder 48 (see FIG. 4) to bring the piston 44 to the end of its travel, as shown in FIG. 4. The cam 12 of the device 1 has no inclination owing to the action of the finger 45 of the piston 44. The cam 13, on the other hand, is brought to its position of maximum inclination by the action of the piston 39 against which the pressure in the chamber 40 acts. The hydraulic unit 2 therefore tends to discharge at maximum output into the other hydraulic unit 1, but the latter cannot receive this discharge as its output is zero. The hydraulic unit 2 is therefore held or locked stationary whereas the unit 1 rotates freely.

As the unit 2 is held stationary, it also holds the sun gear 63 of the differential stationary, through the medium of the gears 33 and 34. The gears 67, 68, 69 and 70 of the differential, which are engaged with the gear 63 of the shaft 60, therefore cause the gear 66 of the shaft 64 to rotate at the speed of the input shaft 56 multiplied by the multiplication ratio chosen for this gear train.

The reversing gear train, consisting of the gears 71, 72, 74, and 75, rotates the gear 77 of the output shaft 78 at the same speed as the gear 65 but in the opposite direction.

Meanwhile, the carrier 57 rotates the gear 25 and in consequence the hydraulic unit 1, but this rotation occurs without absorbtion or transmission of power apart from that necessary to overcome friction, since, as has been explained, this unit 1 has no output.

The multiplication ratio of the gear train is so chosen that the output shaft 78 rotates at the desired constant speed, for example 8000 r.p.m. for the lowest of the usual operational speeds of the input shaft 56 (for example the slow speed of the motor or of the jet engine of an aircraft).

When this desired constant speed is reached, the speed governor 50 actuates the slide 49 which controls the movement of the piston 44 so as to permit the cam 12 of the hydraulic unit 1 to assume a certain inclination under the effect of the piston 36. In consequence, the unit 1 commences to receive a certain hydraulic discharge from the other unit 2.

Thus the unit 2 starts to rotate and allows the gear 63 to rotate, which reduces the multiplication ratio in accordance with the well-known characteristics of stepdown or step-up planet gears. A part of the power of the input shaft 56 continues to be transmitted by the gears 55, 67, 69, 70 and 66 to the gear 65 and therefore to the shaft 78. Another part of this power is transmitted by the gears 68 and 63 to the gears 34 and 33 which transmit it to the rotor 4 of the hydraulic unit 2. The latter transmits this power hydraulically to the unit 1 which returns it through the gears 24 and 25 to the planet gear carrier 57, which in turn returns this power to the gear 66 driving the output shaft through the gears 67, 69 and 70 which act as an ordinary differential the principle of which is well known.

The action of the governor 50, through the medium of the slide 49 controlling the piston 44, adjusts the travel and therefore the discharge or output of the unit 1 in such manner as to maintain the speed of the output shaft 78 at the desired constant value.

The power supplied by the input shaft 56 is always fully transmitted, the major part of this power being transmitted directly through the gear, only a minor part being transmitted through the hydraulic units 1 and 2.

As the speed of the input shaft increases, the inclination of the cam of the hydraulic unit 1 also increases and the proportion of the power transmitted hydraulically increases until the two units 1 and 2 are at maximum discharge (the unit 2 being always at maximum discharge and the unit 1 reaching this maximum discharge as a result of the displacement of the piston 44 controlled by the slide 49 and the governor 50).

It could be advantageous to arrange the gears driving the two hydraulic units in such manner that the units 1 and 2 rotate at this moment at the same speed, their capacities being then identical and the hydraulic output of the transmission being maximum.

At this moment, if the speed of the input shaft 56 continues to increase, the governor 50 tends to shift the piston 44 toward the end of the chamber 48, but the finger 45 then leaves the cam 12 which is held in abutment by the pressure supplied by the hydraulic units 1 and 2 acting in the chamber 38 on the piston 36. On the other hand, the finger 46 comes into contact with the cam 13 of the unit 2 and the inclination of the cam decreases which therefore tends to decrease the output of this unit. As the unit 1 remains at constant travel and therefore has a constant output per rotation, the action of the governor 50, through the slide 49 and the piston 44, adjusts the travel and therefore the output of the hydraulic unit 2 so as to maintain the speed of the output shaft 78 at the desired constant speed.

During this part of the operation, the part of the power of the input shaft 56 transmitted hydraulically decreases, the hydraulic flow between the two hydraulic units also decreasing.

When the action of the piston 44 controlled by the slide 49 and the governor 50 brings, by means of its finger 46, the cam 13 of the unit 2 to its position in which it has no inclination, the unit 1, which is at maximum output, stops. This unit, which was up to this moment a motor, becomes a pump and tends to discharge hydraulically into the unit 2, but the latter cannot receive this discharge as its output is zero, the inclination of the cam 13 being maintained zero by the piston 44.

Thus the hydraulic unit 1 is held stationary as concerns rotation and also holds the carrier 57 stationary, since the gear 25 is meshed with the gear 24 of the unit 1.

The rotational axes of the double planet gears 67, 68, 69, and 70 are therefore held stationary and the gear train formed by the gears 55, 67, 69, 70 and 66 imparts to the gear 65 a rotational speed equal to the speed of the input shaft 56.

The shaft 56 and the output shaft 78 therefore rotate at exactly the same speed, which is the desired constant speed for the output shaft 78. It is advantageous that, owing to a suitable step-down ratio in the drive of the input shaft, the speed of the latter be close to the higher of the two usual operational speeds (for example, cruising speed of the motor or of the jet engine of an aircraft).

Thus there is obtained a completely mechanical drive without transmission of hydraulic power.

If the speed of the input shaft continues to increase so that the governor 50 actuates still more the slide 49 controlling the displacement of the piston 44, so that the cam 13 of the unit 2 assumes an inclination in the opposite direction to those considered hereinbefore. The cam 12 of the unit 1 is still at maximum inclination and the unit 1 once more commences to rotate, but in the opposite direction to that in which it previously rotated, the unit 1 driving the carrier 57 through the gears 24 and 25.

The gears of the differential 67, 68, 69 and 70, which are engaged with the gear 63 of the shaft 64, cause rotation of the planet gear carrier 57 in such manner as to reduce the multiplication ratio of the gear train to obtain the constant speed desired for the output shaft 78.

The power of the input shaft is therefore transmitted partly mechanically and partly hydraulically. In fact, the gears mechanically transmit a higher power than that required, the excess power being returned to the input shaft through the following operational connection: the gear 66 of the shaft 64 of the differential, gears 70, 69, 67, 68, 63, 34 and 33, the hydraulic unit 2 which discharges into the hydraulic unit 1, gears 24 and 25, carrier 57, gears 67, the excess power being returned to the gear 55 of the input shaft 56.

FIG. 6 shows a modification of the embodiments of the device controlling the inclination of the cams, where like reference characters designate like members of the device shown in FIG. 4. In this modification, the pistons 36 and 39 act on a ball joint 52, 53 unitary with the cams 12, 13 respectively, and the piston 44 determines the position of the cams by acting on the rods 54, 55 which are unitary with the pistons 36 and 39 and extend into the cylinder 48. The operation of this device is, moreover, identical to that shown in FIG. 4.

Although specific embodiments of the invention have been described, many modifications and changes may be made therein without departing from the scope of the invention as defined in the appended claim. Thus, the hydraulic units, instead of being barrel pumps, could be pumps of another type, such as blade pumps, radial piston pumps or gear pumps. These hydraulic units, instead of being disposed side by side and parallel with the axis of the transmission, could be disposed coaxially or concentrically. The device controlling the inclination of the cams could be of another hydraulic type or could even be mechanical; there could be provided a separate device for each cam. The mounting of the cams could be different from that described and could comprise, for example, two journals fixed to the transmission case. Instead of having the output sun gear of the first differential train connected to the cylindrical block of the second hydraulic device and directly meshed with one of the teeth of the double planet gears of the first differential, and instead of having the planet gears of the second gear train meshed with the input sun gear through the medium of the teeth of the planet gears of the first train which is engaged with said input sun gear, it could be arranged to connect, as concerns rotation, the output sun gear of the first train to the output shaft and to engage the planet gears of the second train, whose output gear is connected to the second hydraulic unit, with the teeth of the planet gears of the first train which is engaged with the output sun gear of the first train, these last-mentioned teeth having therefore a double width; this would have for result to rotate the sun gear connected to the output shaft in the same direction as the sun gear connected to the input shaft with consequent elimination of the speed-reversing gears. The planet gear trains could be of any type, for example they could have an output crown gear instead of an output sun gear.

What I claim is:

An hydraulic transmission of the type comprising two hydraulic devices each having a rotatably mounted non-adjustable cylindrical block, pistons movable in said block and a pistons control member to move said pistons when said block and said control member are given a rotation movement one relatively to the other, said control member being fixed in rotation and adjustable in inclination to control the output of said hydraulic device, distributing means fixed in rotation for hydraulically connecting said hydraulic devices, an input shaft, an output shaft, a planetary differential gear having an input sun gear drivingly connected to said input shaft, a planet gear carrier drivingly connected to one of said cylindrical blocks, a first output sun gear drivingly connected to said output shaft, a second output sun gear drivingly connected to the other of said cylindrical blocks, a first group of double planet gears carried by said planet gear carrier and comprising each two drivingly connected gears respectively meshing with said input sun gear and said second output sun gear, a second group of double planet gears carried by said planet gear carrier and comprising each two drivingly connected gears respectively meshing with said first output sun gear and with said gears of said first group of double planet gears meshing with said input sun gear, and means for simultaneously adjusting the inclination of both said pistons control member.

References Cited in the file of this patent

UNITED STATES PATENTS

| | | |
|---|---|---|
| 1,197,789 | Bluemel | Sept. 12, 1916 |
| 2,580,946 | Orshansky et al. | Jan. 1, 1952 |
| 2,599,814 | Cull | June 10, 1952 |

FOREIGN PATENTS

| | | |
|---|---|---|
| E 10,760 II/63c | Germany | Feb. 9, 1956 |